United States Patent [19]
Vandre

[11] 3,872,599

[45] Mar. 25, 1975

[54] BENT EMPTY CAN DETECTOR AND METHOD

[75] Inventor: Herbert M. Vandre, Rochelle, Ill.

[73] Assignee: Del Monte Corporation, San Francisco, Calif.

[22] Filed: Jan. 8, 1973

[21] Appl. No.: 321,685

[52] U.S. Cl. ........... 33/174 R, 33/178 R, 33/178 B, 209/80
[51] Int. Cl. .......................... G01b 3/46, G01b 5/12
[58] Field of Search .......... 33/174 L, 174 R, 178 R, 33/178 B; 113/115; 193/32; 209/80, 82, 90, 123; 53/53; 192/25 B

[56] References Cited
UNITED STATES PATENTS

| | | | |
|---|---|---|---|
| 1,157,389 | 10/1915 | Hess | 33/178 B |
| 2,269,474 | 1/1942 | Nordquist | 209/90 |
| 2,387,697 | 10/1945 | Yost | 209/82 |
| 2,696,296 | 12/1954 | Simpson | 209/82 |

Primary Examiner—Harry N. Haroian
Assistant Examiner—Richard R. Stearns
Attorney, Agent, or Firm—Flehr, Hohbach, Test, Albritton and Herbert

[57] ABSTRACT

Apparatus and method for detecting bent cans being supplied in single file to processing operations (e.g., aseptic can filling). Gauging members are carried by a freely rotatable wheel which is mounted alongside the downwardly extending portion (i.e., gravity drop) of guide means through which the can are moving single file. As the cans move downwardly, the rollers move into and out of the successive cans, thereby detecting a can which is out of round, seriously dented, or improperly oriented in the guide means.

2 Claims, 3 Drawing Figures

BENT EMPTY CAN DETECTOR AND METHOD

BACKGROUND OF THE INVENTION

This invention relates generally to apparatus for detecting dimensionally defective or misaligned empty cans being fed to processing operations.

The handling and feeding of cans in food canning plants involves use of a so-called depalletizer or unscrambler which segregates and orients cans from an indiscriminate group and presents them in a single file train or stream to can filling or other processing operations. In the operation of such equipment the empty cans are subjected to forces and impacts tending to cause nicks, dents, and ovals. Ovals are cans that have been bent in such a manner as to make the can out-of-round as viewed toward its open end. Steel cans generally have sufficient strength to avoid such difficulties. However, aluminum cans have less strength and are quite susceptible to such injuries. A can that is out-of-round, or one which has a serious dent in its side wall, will cause jamming of processing equipment, with resulting shutdown to correct the difficulty. This is particularly serious with aseptic canning processes where the equipment handles the cans within enclosures that are not readily accessible. Aside from the difficulties just mentioned, it is not uncommon for cans to be misoriented as presented to the processing equipment, and this likewise causes jamming and interferes with proper operation.

In general, there is a need for a simple device which can be installed on prevailing equipment and which will detect and prevent improperly dimensioned or oriented cans from reaching the processing equipment.

SUMMARY OF THE INVENTION

In general, it is an object of the present invention to provide apparatus capable of detecting cans that are dimensionally defective, and which will prevent such cans from reaching the processing equipment to which the cans are being fed.

Another object of the invention is to provide apparatus of the above character which is relatively simple and which can be easily installed with prevailing can handling equipment. A feature of the apparatus is that it does not require any separate source of power, but operates in conjunction with cans moving downwardly through a gravity type can drop.

The present invention consists of apparatus which is installed in conjunction with a gravity type can drop through which the cans move in single file, with like orientation. At what may be termed a detecting station, means is provided for automatically introducing and removing a generally spherical gauging member into the open end of each can. In the event a can is dimensionally defective, as for example out-of-round or with a substantial side dent, or in the event it is not properly oriented, then further downward movement of the cans is arrested until the defective can is manually removed.

Additional objects and features of the invention will appear from the following description in which the preferred embodiment has been set forth in detail in conjunction with the accompanying drawing.

DESCRIPTION OF THE PREFERRED EMBODIMENT

Figure 1:
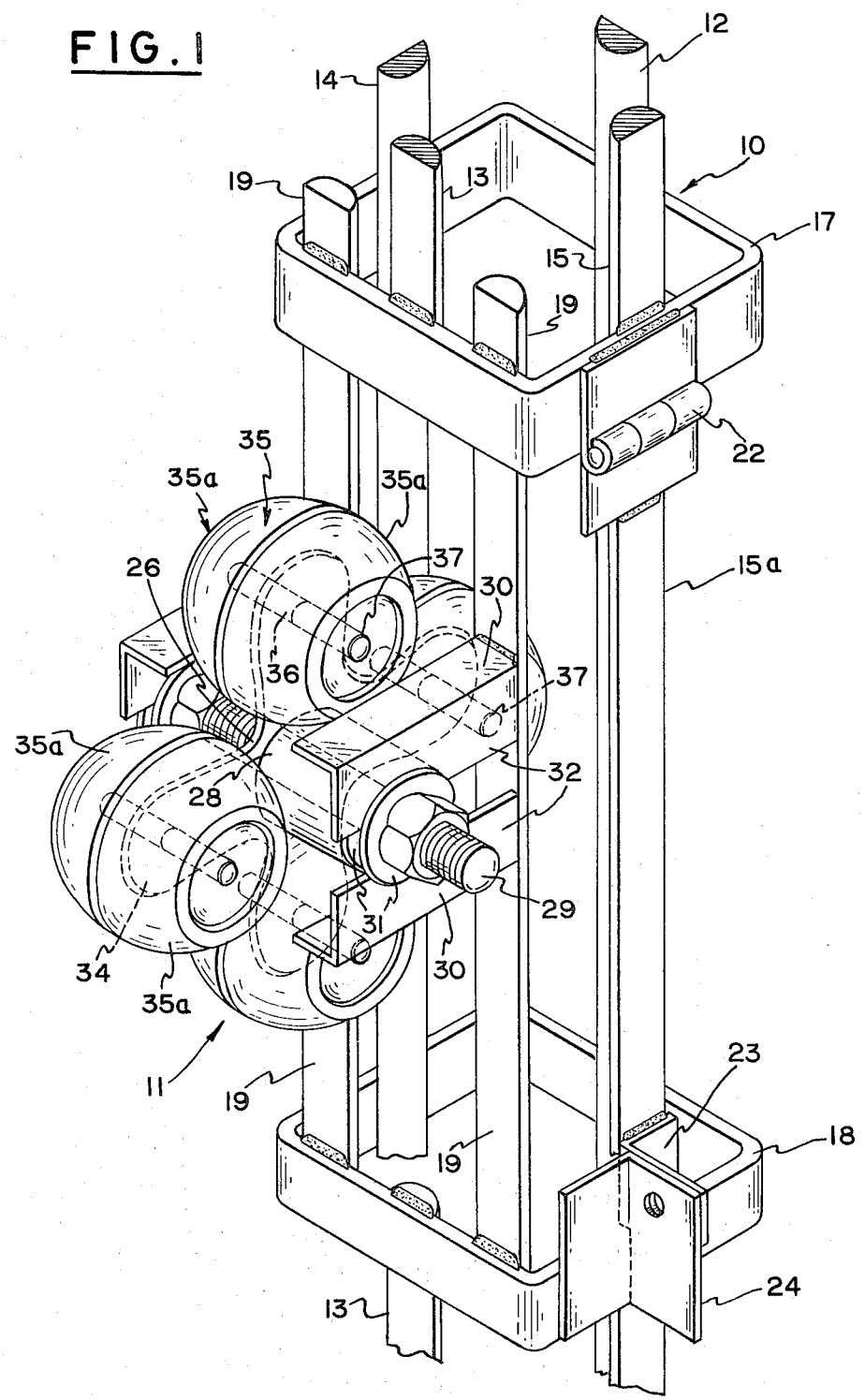
FIG. 1 is a perspective view incorporating the present invention.

FIG. 1 of the drawing shows a portion 10 of a gravity drop through which cans are adapted to move in a single file, together with gauging means 11. A conventional gravity type drop commonly consists of rails 12, 13, 14 and 15 which are spaced apart to receive a single file train or stream of cans, with the axes of the cans generally horizontal and the bottoms and open mouths of the cans adjacent the rails 12 and 13 respectively.

To facilitate the mounting of the gauging means 11, upper and lower bands 17 and 18 are provided and are secured to the short supplemental guide rails 19. Between the bands 17 and 18 the side guide rail 15 is also cut away, and within the gap between the ends of the rail there is a short rail section 15a. The upper end of rail section 15a is shown attached to the hinge 22, and the lower end is attached to a tab 23 which in turn can be removably secured to the tab 24, the latter being secured to the band 18. With this arrangement, the short rail section 15a can be swung outwardly for the purpose of manually removing a defective can. The rail 13 is likewise cut away between the bands 17 and 18, and during movement between the bands the open end of the can is guided by the rails 19.

The gauging means 11 consists of a wheel 26 which is fixed to one end of the hub 28. This hub is journalled upon the shaft 29, the end portions of which are secured to angle iron members 30 which are secured as by welding to the rails 19. Preferably the attachment of the shaft 28 to the members 30 permits some adjustment. Thus, as illustrated, the shaft is provided with clamping washers 31 which engage the spaced flanges 32 of the members 30.

The wheel 26 is provided with arms 34 which carry the gauging members 35. Preferably these gauging members are each in the form of rollers that are generally spherical in configuration. In the construction illustrated, each of the rollers is made in two halves 35a, which are journalled on the pins 36. These pins in turn are secured to the arms 34 of the wheel. The ends of the pins 36 are provided with suitable retaining means, such as snap-in rings 37, for retaining the halves of the spheres upon the pins 36. Preferably the rollers are made of a non-metallic material like nylon.

With the arrangement described above, the wheel rotates about a horizontal axis which is at right angles to the downward path of movement of the cans, and also at right angles to the axes of the cans. The rollers are free to rotate about the axes of the pins 36. They are dimensioned whereby the spherical configuration which they present is slightly smaller in diameter than the inner diameter of the mouths of the cans. Thus, if a can is properly dimensioned a roller is free to move into and out of the can without resistance.

Figure 2:
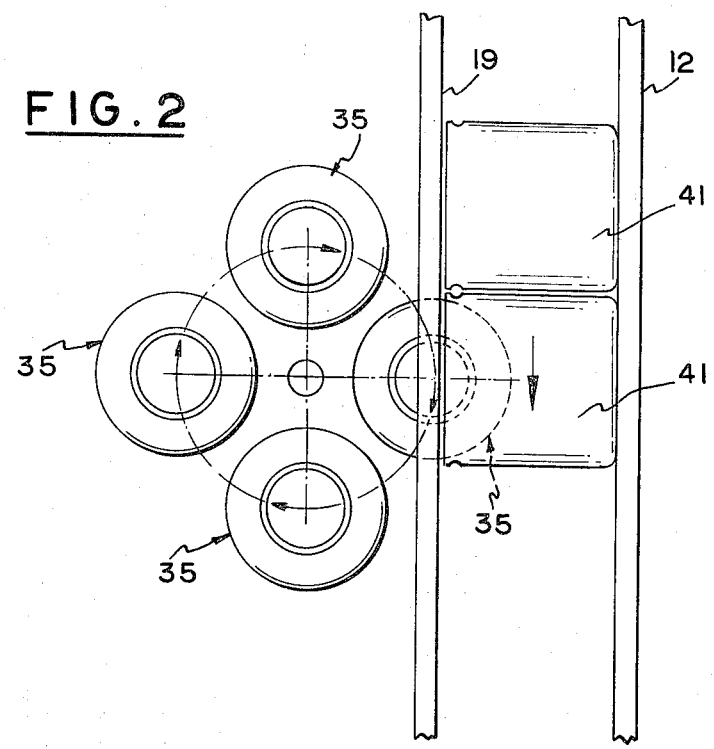
FIGS. 2 and 3 are schematic side elevational views illustrating operation of the apparatus.
Figure 3:
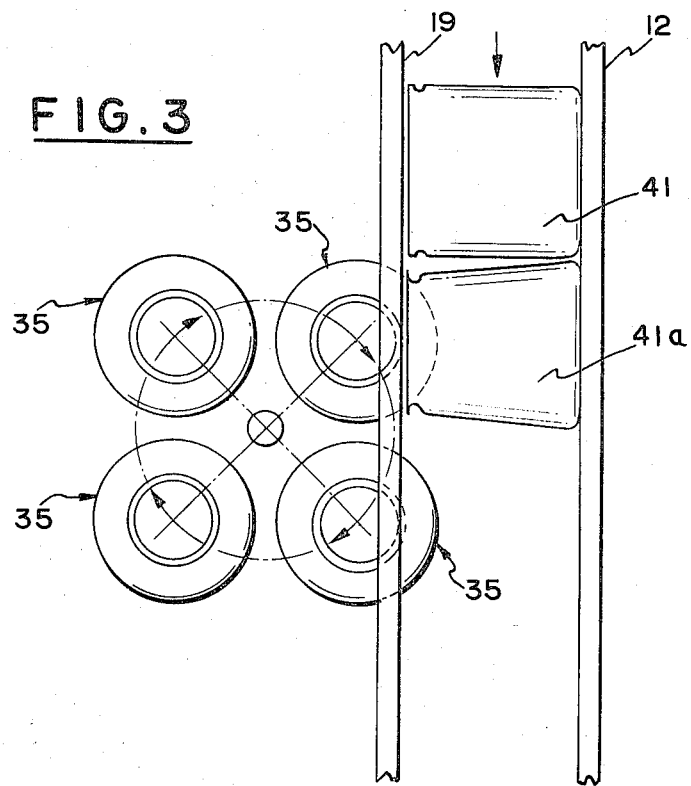

FIGS. 2 and 3 illustrate how the invention operates in practice with a single file train of cans moving downwardly and eventually being received by can processing equipment, such as a can filling and sealing machine of the aseptic type. As shown in FIG. 2, a lowermost one of the cans 41 has its axis at the same level as the axis of rotation of the gauging means 11, and one of the gauging members or rollers is shown extending substantially half way into the open end of the can. As the train of cans continues to move downwardly, the wheel rotates whereby the roller is withdrawn from the can, while the next succeeding roller moves toward the next can and into its open end. In this manner the train of cans moves continuously, and the gauging means likewise rotates continuously with continuous movement of the rollers into and out of the can.

FIG. 3 illustrates what happens when a deformed can reaches the detecting station. The can 41a in this instance is illustrated as being an oval, or in other words, with a mouth which has been bent out of circular form. A roller cannot enter such a can, and therefore downward movement of the can is prevented, and the entire train of cans is brought to a stop. This can must now be manually removed, as by swinging out the rail section 15a.

As shown in FIG. 1, the end faces of the rollers are flat and the distance between the end faces is slightly less than the spacing between rails 19. However, the spacing between rails 19 is less than the diameter of the cans, so that the cans are properly guided.

I claim:

1. Apparatus for detecting dimensionally defective cans having open ends that are out-of-round, comprising downwardly extending guide means for gravity movement of cans in single file with the cans disposed with their axes parallel and extending substantially perpendicular to the direction of movement, and detecting means at a detecting station for introducing and removing a gauging member into the open end of each properly dimensioned can as the train moves downwardly, the configuration and dimensions of the gauging member being such that it moves freely through the open end of each properly dimensioned can but resists movement into an out-of-round open end of a dimensionally defective can, said detecting means comprising a rotatable wheel, shaft means for rotatably mounting said wheel adjacent one side of the guide means whereby the wheel is free to rotate about the axis of the shaft means, said shaft axis being horizontal and at right angles to the direction of movement of the cans and at right angles to the axes of the cans, a plurality of circumferentially spaced gauging members carried by said wheel, said gauging members being generally spherically shaped and dimensioned to fit within the mouth of a usable can, the disposition of said wheel and said gauging members with respect to the path of movement of the cans being such that as the cans move downwardly into the region of the wheel the gauging members successively move into and out of the cans, the gauging members comprising generally spherically shaped rollers that are journalled to the wheel for rotation about axes parallel to the axis of rotation of the wheel.

2. Apparatus as in claim 1 in which each of said gauging rollers consists of two halves, and a common shaft on which said halves are journalled.

* * * * *

UNITED STATES PATENT OFFICE
CERTIFICATE OF CORRECTION

PATENT NO. : 3,872,599

DATED : March 25, 1975

INVENTOR(S) : Herbert M. Vandre

It is certified that error appears in the above-identified patent and that said Letters Patent are hereby corrected as shown below:

On the cover page, first column after "[73] Assignee:" should read --Del Monte Corporation, San Francisco, Calif. --

Signed and sealed this 27th day of May 1975.

(SEAL)
Attest:

RUTH C. MASON
Attesting Officer

C. MARSHALL DANN
Commissioner of Patents
and Trademarks